United States Patent
Oboodi et al.

(10) Patent No.: US 7,892,659 B2
(45) Date of Patent: Feb. 22, 2011

(54) COATING PRECURSOR MATERIALS, TURBOMACHINERY COMPONENTS, AND METHODS OF FORMING THE TURBOMACHINERY COMPONENTS

(75) Inventors: Reza Oboodi, Morristown, NJ (US); James Piascik, Morristown, NJ (US); Bjoern Schenk, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 285 days.

(21) Appl. No.: 12/182,870

(22) Filed: Jul. 30, 2008

(65) Prior Publication Data

US 2010/0028718 A1  Feb. 4, 2010

(51) Int. Cl.
  *B32B 9/00* (2006.01)
  *B05D 3/02* (2006.01)
(52) U.S. Cl. ............... 428/696; 428/689; 428/697; 427/226
(58) Field of Classification Search ............ 428/688, 428/689, 696, 697, 704; 106/36, 286.6, 286.8, 106/286.27; 427/226
See application file for complete search history.

(56) References Cited

U.S. PATENT DOCUMENTS

| | | | |
|---|---|---|---|
| 3,508,955 A | 4/1970 | Sliney | |
| 4,126,458 A | 11/1978 | Creatura et al. | |
| 4,214,905 A | 7/1980 | Sliney | |
| 4,256,489 A | 3/1981 | Van Wyk | |
| 4,394,275 A | 7/1983 | Bickle et al. | |
| 4,554,084 A | 11/1985 | Lonne et al. | |
| 4,662,998 A | 5/1987 | Stern | |
| 4,728,448 A | 3/1988 | Sliney | |
| 4,743,926 A | 5/1988 | Schmidlin et al. | |
| 4,965,001 A | 10/1990 | King | |
| 5,024,882 A | 6/1991 | Matucha et al. | |
| 5,030,977 A | 7/1991 | Hanson et al. | |
| 5,242,563 A | 9/1993 | Stern | |
| 5,271,956 A * | 12/1993 | Paz-Pujalt | 427/108 |
| 5,358,547 A | 10/1994 | Holko | |
| 5,433,870 A | 7/1995 | Nakamaru et al. | |
| 5,434,210 A | 7/1995 | Rangaswamy et al. | |
| 5,464,486 A | 11/1995 | Rao | |
| 5,709,936 A | 1/1998 | Besmann et al. | |
| 5,766,690 A | 6/1998 | Derby et al. | |
| 5,819,774 A | 10/1998 | Beardsley et al. | |
| 5,866,518 A | 2/1999 | Dellacorte et al. | |
| 6,015,775 A | 1/2000 | Takayama et al. | |
| 7,297,367 B2 | 11/2007 | Oboodi et al. | |

OTHER PUBLICATIONS

EP Search Report—Honeywell.

* cited by examiner

*Primary Examiner*—Gwendolyn Blackwell
(74) *Attorney, Agent, or Firm*—Ingrassia Fisher & Lorenz, P.C.

(57) ABSTRACT

Coating precursor materials, turbomachinery components, and methods of manufacturing the components are provided. In an embodiment, by way of example only, a coating precursor material includes a solid film lubricant component and a bonding component comprising at least one eutectic mixture, said at least one eutectic mixture selected from a group consisting of barium fluoride/nickel fluoride, barium fluoride/cobalt fluoride, and barium fluoride/barium fluoride-boron oxide.

20 Claims, 3 Drawing Sheets

COATING PRECURSOR MATERIALS, TURBOMACHINERY COMPONENTS, AND METHODS OF FORMING THE TURBOMACHINERY COMPONENTS

TECHNICAL FIELD

The inventive subject matter generally relates to turbomachinery, and more particularly relates to coatings and coated components for use in turbomachinery.

BACKGROUND

Turbochargers are generally used to enhance operability of a device. For example, in the context of turbine engines, turbochargers may be used to heat a volumetric flow of engine exhaust gas to pressurize or boost an intake air stream into a combustion chamber. In this regard, exhaust gas from the engine may be routed into a turbocharger turbine housing within which a turbine is mounted. The exhaust gas flow impinges against the turbine to cause it to spin. Because the turbine is mounted on one end of a shaft that has a radial air compressor mounted on an opposite end, rotary action of the turbine also causes the air compressor to spin. The spinning action of the air compressor causes intake air to enter a compressor housing and to be pressurized or boosted before the intake air is mixed with fuel and combusted within an engine combustion chamber.

To reduce friction between and to extend the useful lives of the rotating components of the turbocharger, foil bearings may be used to support rotating components of the turbine engines, turbochargers, and the like. Generally, a foil bearing includes a journal mounted to the rotating component and a cylindrical top foil disposed around the journal. The journal and top foil are configured such that when the rotating component rotates at an optimum operational speed, the foil and the journal separate from each other to form an air gap. As the air gap between the foil and the journal grows, pressurized air is drawn in to serve as a load support and act as a lubricant to the rotating component and surrounding static components.

In the absence of the pressurized air between the journal and the top foil, the two components may come into contact with each other or with other surrounding components. Thus, to protect the components from premature wear, one or more of the components may include a coating thereon. The coating may having a formulation that includes one or more solid lubricant constituents, such as a graphite fluoride/polymer composites, molybdenum disulfide, silver, calcium fluoride, and/or ternary carbide and nitride materials. To bond the solid lubricant constituents to the substrate, one or more bonding constituents may be included in the coating formulation.

In the past, fluorides have been used as bonding constituents. However, under certain conditions, they may undesirably at least partially decompose the component to be coated during processing. Other bonding constituents, such as eutectics have been employed in other formulations. However, application of coating formulations that include the eutectics may not be used in certain coating formation processes (such as sintering processes) that are limited to low processing temperatures (e.g., about 1000° C.). Specifically, a temperature representing a softening point of the eutectic portion of the coating formulation may exceed the low processing temperature limits.

Hence, there is a need for a method for coating turbocharger components that does not affect the component to be coated and that may be used in low temperature coating processes where processing temperatures may be limited to about 1000° C. Additionally, there is a need for a coating that has improved oxidation-resistance, as compared to conventional coatings. Moreover, it is desirable for the methods of manufacturing the coating to be relatively simple and inexpensive to perform.

BRIEF SUMMARY

Coating precursor materials, turbomachinery components, and methods of manufacturing the components are provided.

In an embodiment, by way of example only, a coating precursor material includes a solid film lubricant component and a bonding component comprising at least one eutectic mixture, said at least one eutectic mixture selected from a group consisting of barium fluoride/nickel fluoride, barium fluoride/cobalt fluoride, and barium fluoride/barium fluoride-boron oxide.

In another embodiment, by way of example only, a turbomachinery component includes a substrate and a coating. The coating is over the substrate and comprises a solid film lubricant component and a bonding component. The bonding component comprises at least one eutectic mixture, and the at least one eutectic mixture is selected from a group consisting of barium fluoride/nickel fluoride, barium fluoride/cobalt fluoride, and barium fluoride/barium fluoride-boron oxide.

In still another embodiment, by way of example only, a method of manufacturing a turbomachinery component includes the steps of applying a coating precursor material to a substrate, wherein the coating precursor material comprises a solid film lubricant component and a bonding component, and the bonding component comprises at least one eutectic mixture, the at least one eutectic mixture selected from a group consisting of barium fluoride/nickel fluoride, barium fluoride/cobalt fluoride, and barium fluoride/barium fluoride-boron oxide and heating the substrate to a predetermined processing temperature to form a portion of a coating over the substrate.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
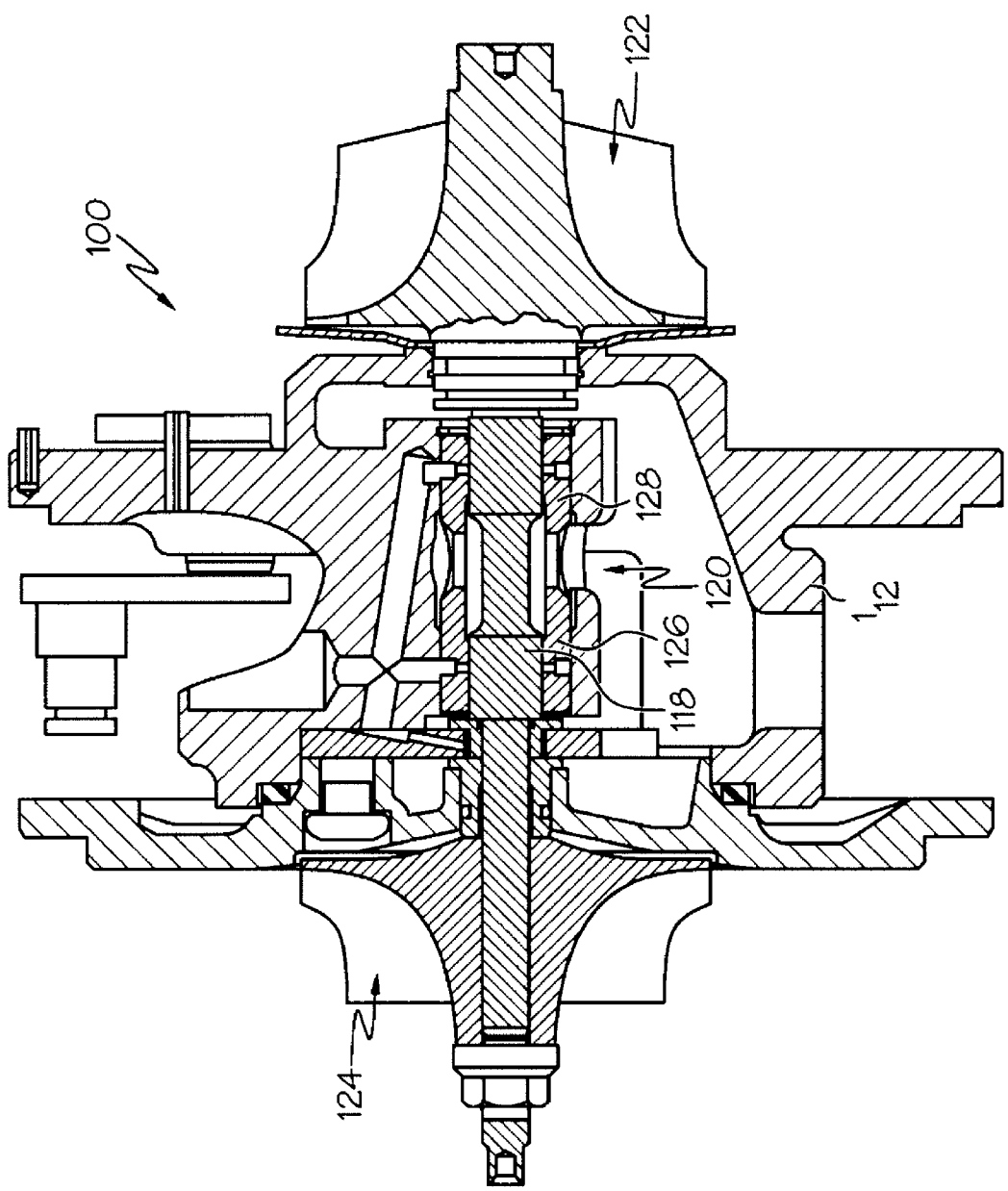
FIG. 1 is a cross-sectional side view of a turbocharger, according to an embodiment.

FIG. 1 is a cross-sectional side view of a turbocharger 100, according to an embodiment. The turbocharger 100 generally includes a housing 112 within which a shaft 118 is rotatably disposed. A turbine or turbine wheel 122 is attached to one end of the shaft 118, and a compressor impeller 124 is attached to an opposite end of the shaft 118. To reduce wear between the shaft 118 and surrounding component, a bearing assembly 120 surrounds the shaft 118. In an embodiment, the bearing assembly 210 includes two bearings 126, 128, one or both of which are made up of foil bearings. In other embodiments, the bearings 126, 128 may include or may be made up of different bearings. Although two bearings 126, 128 are shown, fewer or more bearings may be included.

Figure 2:
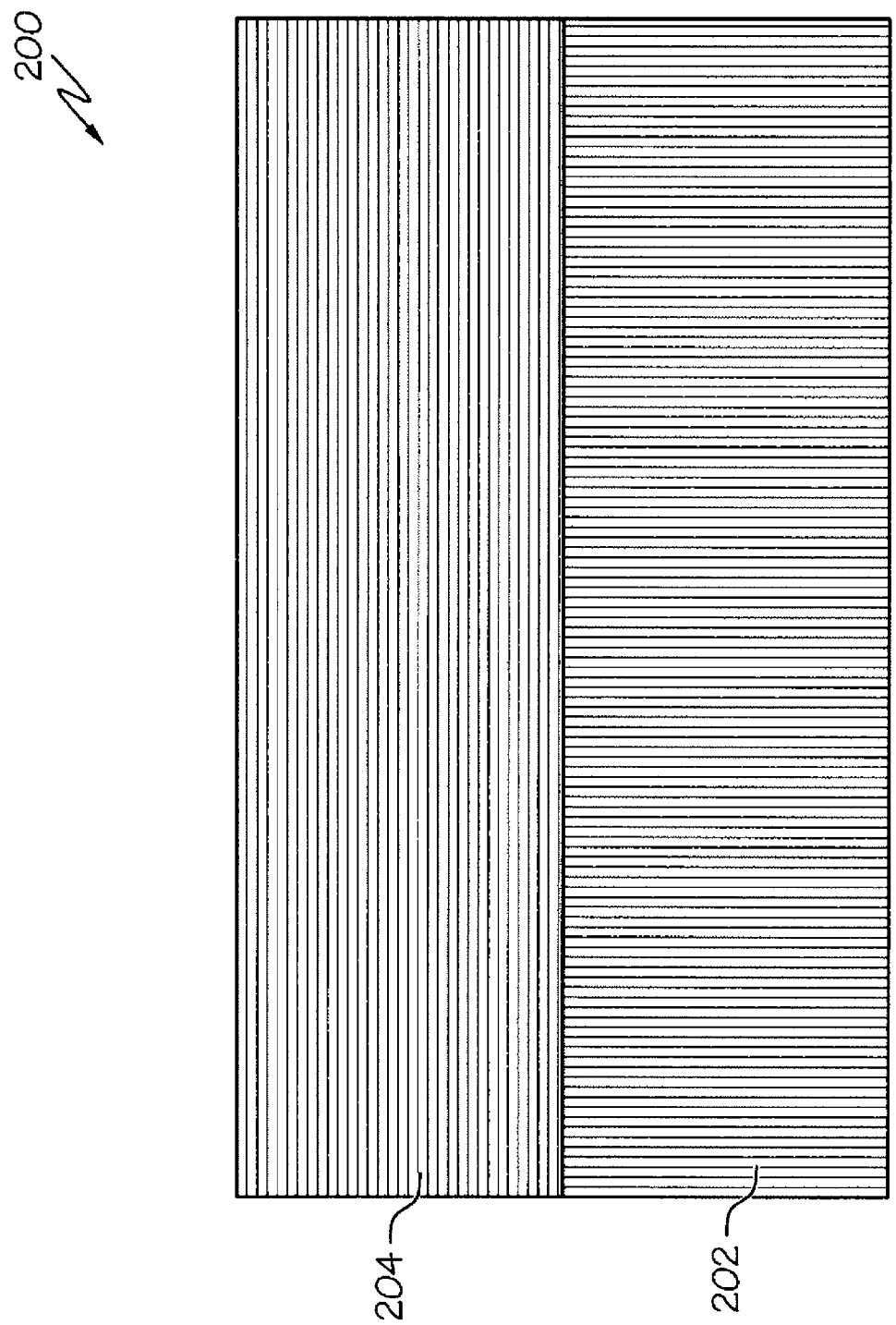
FIG. 2 is a cross-sectional view of a portion of a component that may be used in the turbocharger of FIG. 1, according to an embodiment.

One or more of the turbocharger components maybe made from or coated with one or more solid lubricant materials. FIG. 2 is a cross-sectional view of a portion of a component 200 that may be used in a turbomachinery component, such as in the turbocharger of FIG. 1, according to an embodiment. In an embodiment, the component 200 may be a bearing, such as a foil bearing, journal bearing, roller bearing, and the like. In another embodiment, the component 200 may be a rotating or a stationary turbine blade, airfoil, impeller, shroud, housing, strut, or other component that may be subjected to relatively high temperatures, such as those in excess of 350° C. In any case, the component 200 may be made up of a substrate 202 having a coating 204 thereon. The substrate 202 may be made of a metal, such as a nickel-based alloy, cobalt-based alloy, and the like, or other materials typically used for machine components. Although the portion of the substrate 202 of FIG. 2 is shown to have a rectangular cross section, substrates may have different geometrical cross-sectional shapes, in other embodiments.

The coating 204 is disposed over the substrate 202. The coating 204 may be disposed directly on the substrate 202, in an embodiment such as shown in FIG. 2. In another embodiment, one or more intervening layers (not shown) may be included between the coating 204 and the substrate 202. The coating 204 may have a thickness in a range of between about 1.0 micron to about 100 microns, in an embodiment. In another embodiment, a thickness may be about 25 microns. In other embodiments, the coating 204 may be thicker or thinner than the aforementioned range.

The coating 204 has a formulation that may include at least one or more solid film lubricants and one or more bonding components. In an embodiment, the solid film lubricant and/or bonding components may include one or more inorganic materials. The inorganic materials may be selected for certain desired properties. For example, in accordance with an embodiment, the inorganic material may be capable of providing solid film lubricant properties to the coating 204. Suitable materials possessing such properties include those having the chemical formula $M_{n+1}AX_n$ (hereinafter referred to as "MAX materials"), wherein M is at least one early transition metal selected from groups IIIB, IVB, VB, and VIB, A is at least one element selected from groups IIIA, IVA, VA, VIA, and VIIA, X is one or both of carbon and nitrogen, and n is an integer between 1 and 3. Examples of MAX materials include, but are not limited to aluminum-based compounds selected from the group consisting of $Cr_2AlC$, $V_2AlC$, $Ti_2AlC$, $Ti_3AlC_2$, $Ti_4AlN_3$, $Ta_2AlC$, $Ta_4AlC_3$, and $Ti_2AlN$. Another example of suitable materials capable of providing sold film lubricant properties include, but are not limited to, one or more metal sulfides, metal fluorides, and/or precious metals. In an embodiment, suitable metal sulfides include, but are not limited to $MoS_2$. In another embodiment, suitable metal fluorides include, but are not limited to fluorides of at least one metal selected from the group consisting of a Group IA alkali earth metal, a Group IIA alkaline earth metal, rare earth metal, and mixtures thereof. In other embodiments, suitable precious metals exhibiting solid film lubricant properties may include, but are not limited to silver, gold, platinum, palladium, rhenium, copper, and mixtures thereof.

In another embodiment, the inorganic material may be selected for an ability to serve as a bonding component for the solid film lubricant. In an example, a suitable inorganic material may be a mixture selected for an ability to melt at a lower temperature than a temperature at which individual components of the mixture may melt. In this regard, the inorganic material may be an inorganic eutectic mixture. In one embodiment, the inorganic eutectic mixture may be selected to have a softening point at a temperature that is below a maximum processing temperature used during a coating formation process. As used herein, the term "softening point" may be defined as a temperature at which the inorganic eutectic mixture becomes semi-fluid. For example, in a coating formation process, such as a sintering process, in which a maximum processing temperature of about 1000° C. is employed, the bonding component may be selected to have a softening point temperature that is lower than about 1000° C. In another example, the softening point temperature may be at least about 50° C. lower than the maximum processing temperature. Suitable inorganic eutectic mixtures for the bonding component include, but are not limited to barium fluoride/nickel fluoride, barium fluoride/cobalt fluoride, and barium fluoride/barium fluoride-boron oxide. Inclusion of one or more of the aforementioned inorganic eutectic mixtures may reduce corrosion and oxidation and may improve wear properties of the coating 204. Moreover, because the inorganic eutectic mixtures may be used in lower temperature processes, they may be applied to substrates that may be limited to being coated using such low temperature processes. Additionally, by using one or more of the inorganic eutectic mixtures, the coating 204 may be subjected to operating temperatures that are greater than 535° C., and in some cases, to temperatures of at least about 650° C.

In still another embodiment, the coating 204 may have a formulation that further includes an inorganic material that may be selected for having an ability to provide wear-resistance properties to the solid film lubricant. In such case, the inorganic material may be a metal oxide, such as chromic oxide, nickel oxide, aluminum oxide, boron oxide or another metal oxide.

In yet another embodiment, the formulation of the coating 204 may include a non-metallic component. Suitable non-metallic components include, but are not limited to ceramics, silicates, and/or binders. Suitable examples of ceramics include, but are not limited to $Cr_2O_3$, $Al_2O_3$, and $TiO_2$. Suitable examples of silicates include, but are not limited to sodium silicate. The binder may be an organic or inorganic binder. For example, suitable organic binders include, but are not limited to organic polymer binders, such as ethyl cellulose and nitrocellulose. Inorganic binders that may be incorporated include, but are not limited to fluoride glasses.

Figure 3:
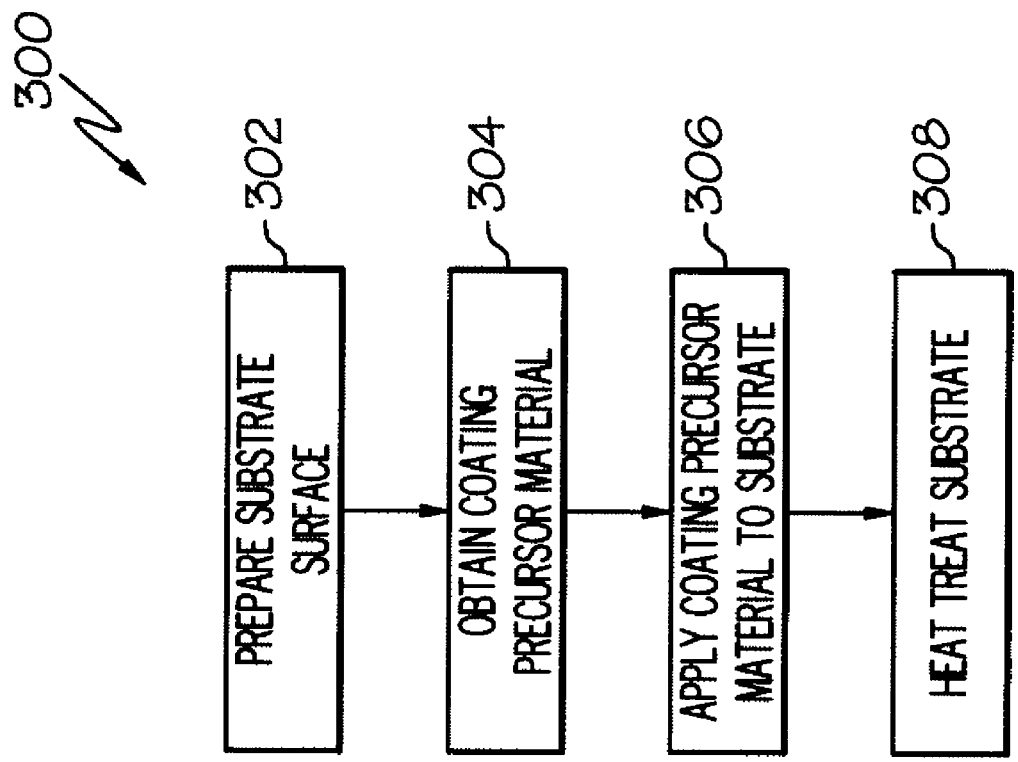
FIG. 3 is a flow diagram of a method for manufacturing a component of the turbocharger, according to an embodiment.

To form a turbomachinery component having the coating 204 thereon, a method 300 depicted in FIG. 3 may be employed. In an embodiment, the method 300 includes preparing a surface of a substrate to be coated, step 302. In an example, the substrate may be the turbomachinery component. The surface preparation may include a chemical process. For example, the substrate surface may be chemically etched to provide a micro-roughened surface adapted for bonding coated particles thereto. In an embodiment, the substrate surface may be chemically etched by applying a chemical etchant thereto. Suitable chemical etchants include, but are not limited to a solution of ferric chloride (e.g., 40 weight % ferric chloride in water) and a dilute mineral acid. In another example, surface preparation may include oxidizing the substrate surface to form an oxide film thereon. In an embodiment, the substrate surface may be oxidized by exposure to heat in the presence of air. For example, the substrate and the air may be heated to a temperature in a range of between about 500° C. to about 1000° C. or any other temperature suitable for promoting oxidation. In still another example, the substrate surface may be cleaned. In one embodiment, the substrate surface is rinsed with deionized water to remove any traces of chemical etchant, if used, or to remove dust or other unwanted particles.

Before, after, or substantially simultaneously with step 302, a coating precursor material is obtained, step 304. In an embodiment, the coating precursor material includes one or more constituents mentioned above comprising at least the solid film lubricant component and the bonding component. In an embodiment, the solid film lubricant component and the bonding component may be mixed together to form a mixture. In this regard, the solid film lubricant component and the bonding component may be present at a ratio in a range of from about 1:12 to about 1:1 relative to each other, in an embodiment. In another embodiment, the ratio of the solid film lubricant component to the bonding component may be in a range of from about 1:6 to about 1:1. The coating precursor material may be prepared by milling, pulverizing, or otherwise transforming the material into a fine powder. In an embodiment, the fine powder may have particle diameters in a range of from about 1 nanometer to about 25 microns. According to other embodiments, the particle diameters may be smaller or larger.

The coating precursor material may be applied to the substrate, step 306. In one embodiment, the coating precursor material may be mixed with a liquid to form a paste. The liquid may be deionized water, alcohol, or other suitable solvent. In any case, the paste may have a viscosity in a range of from about 50,000 to 300,000 Centipoise, in an embodiment. In another embodiment, the viscosity of the paste may be in a range from about 100,000 to 300,000 Centipoise, but may, in other embodiments, be in a range of from about 100,000 to 250,000 Centipoise. In yet another embodiment, a binder may be added to the paste. For example, suitable binders include organic binders such as ethyl cellulose, nitrocellulose, and acrylic.

The paste may then be applied to the substrate. In an example, the paste may be applied to the substrate by a thick film screen printing process. In an embodiment, a mesh screen is placed over a portion of the substrate to be coated, and the paste is pressed through the mesh onto the substrate. Any marks remaining on the substrate from the mesh may be removed by a subsequent polishing process. In another embodiment, the paste may be formed into a tape and the tape may be transferred to the substrate. In other embodiments, alternate application processes may be employed. For example, the paste may be painted or brushed onto the substrate, or the paste may be sprayed, printed, cast or doctor-bladed onto the substrate.

After the paste is disposed over the substrate, it may be air dried, in an embodiment. In another embodiment, the paste may be dried by heating to a first temperature sufficient to remove substantially all liquid therefrom. In an embodiment, the first temperature may be in a range of from about 85° C. to 150° C. In another embodiment, the first temperature may be in a range of from about 95° C. to 150° C. In still another embodiment, the first temperature may be in a range of from about 100° C. to 150° C. The first temperature may be maintained for a time period in a range of from about 5 minutes to 60 minutes, in an embodiment.

The substrate may be subjected to a heat treatment, step 308. In an embodiment, the heat treatment may occur at a second temperature to impart desired properties into the resultant coating. For instance, the second temperature may be greater than the first temperature and may be sufficient to melt the constituents in the paste without melting the substrate. In an example, the second temperature may be in a range of from about 600° C. to 1200° C. In another embodiment, the second temperature may be below about 1000° C. In another example, the second temperature may be about 535° C. In still other examples, the second temperature may be higher or lower than the aforementioned ranges.

By using an inorganic eutectic mixture that includes, one or more of barium fluoride/nickel fluoride, barium fluoride/cobalt fluoride, and barium fluoride/barium fluoride-boron oxide, a wide variety of processing temperatures may be employed. As a result, different processes may be used to tailor a thickness of a solid lubricant coating. For example, thick-film coating processes, which may employ relatively low processing temperatures (e.g., less than 1000° C.) may be used for forming solid lubricant coatings having a thickness in a range of between about 1 micron about 100 microns. Moreover, by using the aforementioned eutectic mixtures, corrosion of the substrate and/or resultant coating may be reduced, as compared to conventional eutectic mixtures in the formation of the coating.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A coating precursor material, comprising:
a solid film lubricant component; and
a bonding component comprising at least one eutectic mixture, the at least one eutectic mixture selected from a group consisting of barium fluoride/nickel fluoride, barium fluoride/cobalt fluoride, and barium fluoride/barium fluoride-boron oxide.

2. The coating precursor material of claim 1, wherein the solid film lubricant component comprises a material having the chemical formula $M_{n+1}AX_n$, wherein M is at least one early transition metal selected from groups IIIB, IVB, VB, and VIB, A is at least one element selected from groups IIIA, IVA, VA, VIA, and VIIA, X is one or both of carbon and nitrogen, and n is an integer between 1 and 3.

3. The coating precursor material of claim 1, wherein the solid film lubricant component comprises one or more metal sulfides, metal fluorides, and/or precious metals.

4. The coating precursor material of claim 3, wherein a metal sulfide includes $MoS_2$.

5. The coating precursor material of claim 3, wherein a metal fluoride comprises at least one metal selected from a group consisting of a Group IA alkali earth metal, a Group IIA alkaline earth metal, a rare earth metal, and mixtures thereof.

6. The coating precursor material of claim 3, wherein a precious metal comprises a material selected from a group consisting of silver, gold, platinum, palladium, rhenium, copper, and mixtures thereof.

7. The coating precursor material of claim 1, further comprising at least one wear-resistant component comprising a metal oxide.

8. The coating precursor material of claim 7, wherein the metal oxide includes a material selected from a group consisting of chromic oxide, nickel oxide, aluminum oxide, boron oxide or another metal oxide.

9. The coating precursor material of claim 1, further comprising a non-metallic component including at least one of a ceramic, a silicate, and a binder.

10. The coating precursor material of claim 9, wherein the ceramic comprises a material selected from a group consisting of $Cr_2O_3$, $Al_2O_3$, and $TiO_2$.

11. The coating precursor material of claim 9, wherein the silicate comprises sodium silicate.

12. The coating precursor material of claim 9, wherein the binder comprises an organic polymer binder.

13. A turbomachinery component comprising:
a substrate; and
a coating over the substrate, the coating comprising a solid film lubricant component and a bonding component, the bonding component comprising at least one eutectic mixture selected from a group consisting of barium fluoride/nickel fluoride, barium fluoride/cobalt fluoride, and barium fluoride/barium fluoride-boron oxide.

14. The turbomachinery component of claim 13, wherein the solid film lubricant component comprises a material having the chemical formula $M_{n+1}AX_n$, wherein M is at least one early transition metal selected from groups IIIB, IVB, VB, and VIB, A is at least one element selected from groups IIIA, IVA, VA, VIA, and VIIA, X is one or both of carbon and nitrogen, and n is an integer between 1 and 3.

15. The turbomachinery component of claim 13, wherein the solid film lubricant component comprises one or more metal sulfides, metal fluorides, and/or precious metals.

16. The turbomachinery component of claim 13, further comprising at least one wear-resistant component comprising a metal oxide.

17. The turbomachinery component of claim 13, wherein the turbomachinery component comprises a foil bearing.

18. A method of manufacturing a turbomachinery component, the method comprising the steps of:
applying a coating precursor material to a substrate, wherein the coating precursor material comprises a solid film lubricant component and a bonding component, and the bonding component comprises at least one eutectic mixture, the at least one eutectic mixture selected from a group consisting of barium fluoride/nickel fluoride, barium fluoride/cobalt fluoride, and barium fluoride/barium fluoride-boron oxide; and
heating the substrate to a predetermined processing temperature to form a portion of a coating over the substrate.

19. The method of claim 18, wherein the solid film lubricant component comprises a material having the chemical formula $M_{n+1}AX_n$, wherein M is at least one early transition metal selected from groups IIIB, IVB, VB, and VIB, A is at least one element selected from groups IIIA, IVA, VA, VIA, and VIIA, X is one or both of carbon and nitrogen, and n is an integer between 1 and 3.

20. The method of claim 18, wherein the solid film lubricant component comprises one or more metal sulfides, metal fluorides, and/or precious metals.

* * * * *